US006330025B1

United States Patent
Arazi et al.

(10) Patent No.: US 6,330,025 B1
(45) Date of Patent: Dec. 11, 2001

(54) DIGITAL VIDEO LOGGING SYSTEM (75) Inventors: Nitzan Arazi, Ramat-Hasharon; Gilad Rosen, Herzlia; Uri Sheffer, Tel-Aviv, all of (IL)

(73) Assignee: Nice Systems Ltd., Ra'anana (IL)

( * ) Notice: Subject to any disclaimer, the term of this patent is extended or adjusted under 35 U.S.C. 154(b) by 0 days.

(21) Appl. No.: 09/307,718

(22) Filed: May 10, 1999

(51) Int. Cl.[7] .................................................. H04N 7/18
(52) U.S. Cl. ........................ 348/143; 348/153; 348/159
(58) Field of Search .................................. 348/143, 153, 348/154, 159, 512, 513; 707/104; 360/72.1; 386/35, 112; 375/240.28; H04N 7/18

(56) References Cited

U.S. PATENT DOCUMENTS

| | | |
|---|---|---|
| 3,686,434 | 8/1972 | Lemelson . |
| 3,811,008 | 5/1974 | Lee . |
| 4,673,974 | 6/1987 | Ito et al. . |
| 4,814,869 | 3/1989 | Oliver, Jr. . |
| 4,862,292 | 8/1989 | Enari et al. . |
| 4,920,424 | 4/1990 | Hosaka et al. . |
| 4,943,854 | 7/1990 | Shiota et al. . |
| 5,193,000 | 3/1993 | Lipton et al. . |
| 5,343,240 | 8/1994 | Yu . |
| 5,351,129 | 9/1994 | Lai . |
| 5,398,138 | 3/1995 | Tomita . |
| 5,526,133 | 6/1996 | Paff . |
| 5,579,239 | 11/1996 | Freeman et al. . |
| 5,581,297 | 12/1996 | Koz et al. . |
| 5,926,605 | * 7/1999 | Ichimura ............................. 386/112 |
| 6,002,427 | * 12/1999 | Kipust .................................. 348/156 |
| 6,091,771 | * 7/2000 | Seeley et al. ................... 348/153 X |
| 6,188,831 | * 2/2001 | Ichimura .......................... 386/112 X |

* cited by examiner

Primary Examiner—Howard Britton
(74) Attorney, Agent, or Firm—Eitan, Pearl, Latzer & Cohen-Zedek (57) ABSTRACT

A digital video logging system including a plurality of video input devices, a plurality of audio input devices, output apparatus operative to provide either of video and audio output, digital storage apparatus operative to store digitally formatted input, and logging apparatus operative to receive analog input from any of the input devices, convert to digital format any of the analog input received, synchronize any of the digitally formatted input converted from any of the analog input received from more than one of the input devices, selectively provide any of the digitally formatted input to the digital storage apparatus, and selectively provide any of the digitally formatted input to the output apparatus.

30 Claims, 8 Drawing Sheets

| ENTRY | TYPE | SOURCE | LOGGER | CHANNEL | START TIME | STOP TIME |
|---|---|---|---|---|---|---|
| 1 | VIDEO | CAM 1 | 24302 | 1 | 4/29/99 16:00:34 | 4/29/99 17:21:01 |
| 2 | VIDEO | CAM 1 | 24302 | 2 | 4/29/99 16:00:34 | 4/29/99 17:21:01 |
| 3 | VIDEO | CAM 1 | 24302 | 3 | 4/29/99 16:00:34 | 4/29/99 17:21:01 |
| 4 | VIDEO | CAM 1 | 24302 | 4 | 4/29/99 16:00:34 | 4/29/99 17:21:01 |
| 5 | VIDEO | CAM 1 | 24302 | 5 | 4/29/99 16:00:34 | 4/29/99 17:21:01 |
| 6 | VIDEO | CAM 1 | 24302 | 6 | 4/29/99 16:00:34 | 4/29/99 17:21:01 |
| 7 | VIDEO | CAM 1 | 24302 | 7 | 4/29/99 16:00:34 | 4/29/99 17:21:01 |
| 8 | VIDEO | CAM 1 | 24302 | 8 | 4/29/99 16:00:34 | 4/29/99 17:21:01 |
| 9 | VIDEO | CAM 1 | 24302 | 9 | 4/29/99 16:00:34 | 4/29/99 17:21:01 |
| 10 | VIDEO | CAM 1 | 24302 | 10 | 4/29/99 16:00:34 | 4/29/99 17:21:01 |
| 11 | VIDEO | CAM 1 | 24302 | 11 | 4/29/99 16:00:34 | 4/29/99 17:21:01 |
| 12 | VIDEO | CAM 1 | 24302 | 12 | 4/29/99 16:00:34 | 4/29/99 17:21:01 |
| 13 | VIDEO | CAM 1 | 24302 | 13 | 4/29/99 16:00:34 | 4/29/99 17:21:01 |
| 14 | VIDEO | CAM 1 | 24302 | 14 | 4/29/99 16:00:34 | 4/29/99 17:21:01 |
| 15 | VIDEO | CAM 1 | 24302 | 15 | 4/29/99 16:00:34 | 4/29/99 17:21:01 |
| 16 | VIDEO | CAM 1 | 24302 | 16 | 4/29/99 16:00:34 | 4/29/99 17:21:01 |
| 17 | VIDEO | CAM 1 | 24302 | 8 | 4/29/99 16:00:34 | 4/29/99 17:21:01 |

DIGITAL VIDEO LOGGING SYSTEM

FIELD OF THE INVENTION

The present invention relates to surveillance systems in general, and more particularly to digital audio and visual data storage, retrieval, and display, and management systems.

BACKGROUND OF THE INVENTION

Surveillance systems employing video cameras and audio input devices are well known. In a typical system, some or all of the video and audio signals are provided on video screens and via speakers for monitoring by security personnel. It is also known to record some or all of the analog video and audio signals on videotape for later retrieval. However, videotape suffers from serious drawbacks as a storage medium, particularly in view of the large quantity of video information generated by a surveillance system. A major concern is the sheer quantity of tapes to be stored, especially when it is desired to record signals generated by a large number of surveillance cameras. Moreover, in a large system many video tape recorders may be required, resulting in a large capital expenditure, the need to allocate space for the recorders, and the high maintenance costs of recorders due to their mechanical nature. Another problem is the need to frequently change tape cassettes. Degradation of the recording quality due to the wear on reused tapes is yet another problem.

Retrieving information of interest from recorded tapes presents additional challenges. It is the nature of video surveillance that a large part of the tape-recorded video surveillance signals is of no interest whatsoever, since it typically represents a static image of a field of view. Finding a particular sequence representing a significant event can be extremely difficult and time-consuming, requiring tedious human review of hours or days of tape-recorded signals, usually only after the event has occurred.

There have been a number of attempts to overcome these disadvantages, but so far with limited success, or at the cost of additional drawbacks. For example, it is known to multiplex and combine signals from multiple video cameras into a single image comprising multiple viewing windows within the image, each window corresponding to one of the cameras. Such multiplexing is based on decimating the frame rate of each of the video sources by a factor of N and combining N such decimated sources into a single video signal of a standard frame rate. This is called time lapsed recording. However, each camera image in the multiplexed image must undergo compression that may reduce the quality of the recorded image. Also, recording of multiplexed images does not address the problems involved in finding sequences of interest on the recorded tapes. It is also known to record the surveillance video signals selectively in response to input from a human operator who is monitoring the signals or in response to signals generated by sensor devices arranged to detect events such as opening of doors or windows. This technique reduces the total information to be recorded, while preventing storage of much uninteresting information, but at the risk of failing to record significant events which cannot readily or timely be detected by sensors or human operators. Also, the reliance on external input can result in unreliability and increased expense, particularly where human operators are to initiate recording.

SUMMARY OF THE INVENTION

The present seeks to provide a digital audio and visual data storage, retrieval, and display, and management system that overcomes disadvantages of the prior art.

There is thus provided in accordance with a preferred embodiment of the present invention a digital video logging system including a plurality of video input devices, a plurality of audio input devices, output apparatus operative to provide either of video and audio output, digital storage apparatus operative to store digitally formatted input, and logging apparatus operative to receive analog input from any of the input devices, convert to digital format any of the analog input received, synchronize any of the digitally formatted input converted from any of the analog input received from more than one of the input devices, selectively provide any of the digitally formatted input to the digital storage apparatus, and selectively provide any of the digitally formatted input to the output apparatus.

Further in accordance with a preferred embodiment of the present invention the system further includes a database, and the logging apparatus is operative to associate any portion of the digitally formatted input with any of an input channel datum, a time datum, a date datum, a non-ambient characteristic datum, and a trigger datum, and maintain any of the data in the database.

Still further in accordance with a preferred embodiment of the present invention the system further includes a database, and the logging apparatus is operative to associate any portion of the digitally formatted input substantially in real-time to receipt of the portion with any of an input channel datum, a time datum, a date datum, a non-ambient characteristic datum, and a trigger datum, and maintain any of the data in the database.

Additionally in accordance with a preferred embodiment of the present invention the logging apparatus is operative to selectively control any of the input devices to provide analog input therefrom.

Moreover in accordance with a preferred embodiment of the present invention the system further includes at least one cyclic buffer associated with at least one of the input devices, and the logging apparatus is operative to detect a non-ambient characteristic associated with any of the digitally formatted input, cyclically store any of the digitally formatted input in the cyclic buffer prior to detecting the non-ambient characteristic, and provide the any of the digitally formatted input stored in the cyclic buffer to the digital storage apparatus subsequent to the non-ambient characteristic being detected.

Further in accordance with a preferred embodiment of the present invention the digitally formatted input is digitally formatted video input and the non-ambient characteristic is a non-ambient motion characteristic associated with any of the digitally formatted video input.

Still further in accordance with a preferred embodiment of the present invention the digitally formatted input is digitally formatted audio input and the non-ambient characteristic is a non-ambient sound characteristic associated with any of the digitally formatted audio input.

Additionally in accordance with a preferred embodiment of the present invention the logging apparatus is operative to detect the non-ambient characteristic associated with any of the digitally formatted input converted from the analog input received from the at least one input device associated with the at least one cyclic buffer.

Moreover in accordance with a preferred embodiment of the present invention the logging apparatus is operative to detect the non-ambient characteristic associated with the digitally formatted input converted from the analog input received from any of the input devices other than the at least one input device associated with the at least one cyclic buffer.

Further in accordance with a preferred e embodiment of the present invention the system further includes at least one detection device operative to detect a non-ambient characteristic and provide a signal subsequent to and in connection with detection of the non-ambient characteristic, and at least one cyclic buffer associated with at least one of the input devices, the logging apparatus is operative to receive the signal from the detection device, cyclically store any of the digitally formatted input in the cyclic buffer prior to receiving the signal, provide the any of the digitally formatted input stored in the cyclic buffer to the digital storage apparatus subsequent to receiving the signal.

Still further in accordance with a preferred embodiment of the present invention the non-ambient characteristic is a non-ambient motion characteristic.

Additionally in accordance with a preferred embodiment of the present invention the non-ambient characteristic is a non-ambient sound characteristic.

Moreover in accordance with a preferred embodiment of the present invention the non-ambient characteristic is the presence of a transmitted signal detected within a predefined detection region associated with the detection device.

Further in accordance with a preferred embodiment of the present invention the logging apparatus is operative to cyclically store any of the digitally formatted inputs in the cyclic buffer and the digital storage apparatus at a first compression ratio, and the digital storage apparatus is operative to store the digitally formatted input stored in the cyclic buffer at a the first compression ratio, and the digital storage apparatus is operative to store the digitally formatted input not stored in the cyclic buffer at a second compression ratio that is not equal to the first compression ratio.

Still further in accordance with a preferred embodiment of the present invention the system further includes a scheduler operative to activate and deactivate any of the input devices, output apparatus, digital storage apparatus, and logging apparatus in accordance with a predetermined schedule.

Additionally in accordance with a preferred embodiment of the present invention the scheduler is operative to activate the logging apparatus to selectively provide any of the digitally formatted inputs to the digital storage apparatus in accordance with a predetermined schedule.

Moreover in accordance with a preferred embodiment of the present invention the scheduler is operative to instruct any of the input devices, output apparatus, digital storage apparatus, and logging apparatus to operate at a specific compression rate in accordance with a given time in the predetermined schedule.

Further in accordance with a preferred embodiment of the present invention the system further includes a scheduler operative to activate the logging apparatus in accordance with a predetermined schedule to cyclically store any of the digitally formatted input in the cyclic buffer prior to detecting the non-ambient characteristic.

Still further in accordance with a preferred embodiment of the present invention the system further includes a scheduler operative to activate and deactivate the detection device in accordance with a predetermined schedule.

Additionally in accordance with a preferred embodiment of the present invention the scheduler is operative to activate the logging apparatus in accordance with the predetermined schedule to cyclically store any of the digitally formatted input in the cyclic buffer prior to detecting the non-ambient characteristic.

Moreover in accordance with a preferred embodiment of the present invention the plurality of video input devices includes at least one visible light input device capable of providing light input that is visible to the human eye, and at least one infrared light input device capable of providing infrared light input, and the visible light input device and the infrared light input device have substantially the same field of view.

Further in accordance with a preferred embodiment of the present invention the logging apparatus is operative to synchronize digitally formatted input converted from the input received from the visible light input device and the infrared light input device.

Still further in accordance with a preferred embodiment of the present invention the digital storage apparatus is operative to store digitally formatted input converted from the analog input received from a first of the input devices at a first compression ratio and digitally formatted input converted from the analog input received from a second of the input devices at a second compression ratio that is not equal to the first compression ratio.

Additionally in accordance with a preferred embodiment of the present invention the system further includes reporting apparatus operative to provide a real-time activity report relating to any of the inputs.

Moreover in accordance with a preferred embodiment of the present invention the system further includes reporting apparatus operative to provide an off-line activity report relating to any of the data in the database.

Further in accordance with a preferred embodiment of the present invention the system further includes input retrieval apparatus operative to accept a query including at least one datum related to any of the portions of the digitally formatted input, identify the portion associated with the datum in the database, and instruct the logging apparatus to retrieve the portion from the digital storage apparatus, and provide the portion to the output apparatus.

Still further in accordance with a preferred embodiment of the present invention the system further includes annotation apparatus operative to accept an operator annotation related to at least one selected portion of the portions of the digitally formatted input, and maintain the annotation in the database in relation to the selected portion.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
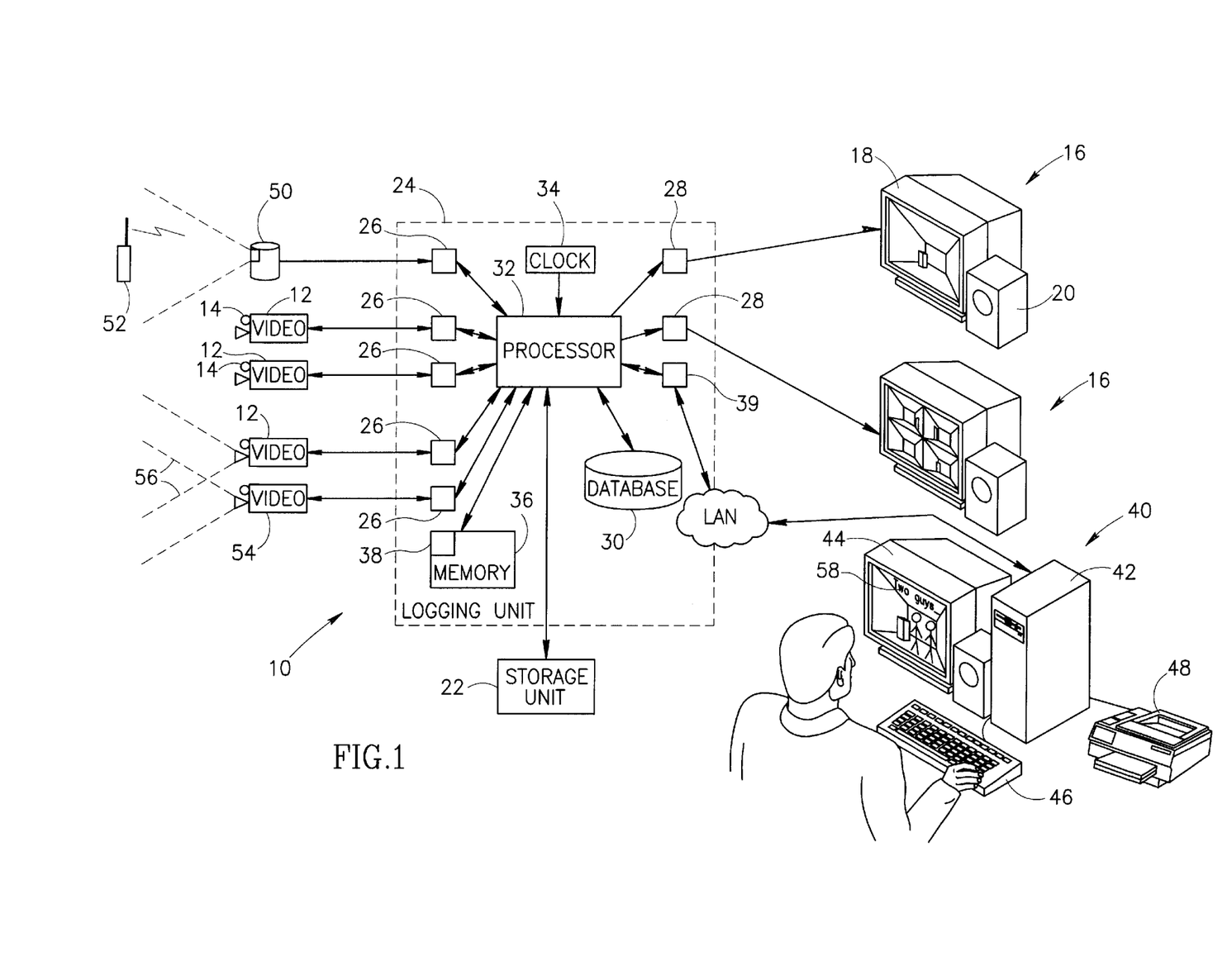
FIG. 1 is a simplified block diagram of a digital video logging system constructed and operative in accordance with a preferred embodiment of the present invention.

Reference is now made to FIG. 1 which is a simplified block diagram of a digital video logging system constructed and operative in accordance with a preferred embodiment of the present invention. The digital video logging system, generally designated 10, typically comprises a plurality of video input devices 12, being any commercially-available video camera that is capable of providing visible-light video input, as well as a plurality of audio input devices 14, being any commercially-available microphone or other audio input device. Each audio device 14 is shown assembled with video device 12, although it is appreciated that devices 12 and 14 need not be assembled as a single unit. System 10 also typically includes output apparatus 16, typically comprising a display 18 and one or more speakers 20, via which video and audio output may be provided. System 10 also typically comprises digital storage apparatus 22 for storing digitally formatted video and audio input. Storage apparatus 22 is preferably a combination of short-term storage, such as one or more hard disks, and long-term storage, such as one or more digital audio tapes (DAT) or advanced intelligent tapes (AIT).

System 10 also typically includes logging apparatus, generally designated 24, which receives inputs from video devices 12 and audio devices 14, converts analog video and audio inputs to digitally formatted input, synchronizes the digitally formatted inputs, stores some or all of the digitally formatted input to digital storage apparatus 22, and provides some or all of the digitally formatted output to output apparatus 16. Logging apparatus 24 typically communicates with devices 12 and 14 via interface circuitry 26, and with output apparatus 16 via interface circuitry 28. Also included in logging apparatus 24 is a database 30 for storing time, date, and other annotations relating to specific segments of recorded audio and video input.

Logging apparatus 24 also includes a microprocessor 32 for controlling any of elements 22, 26, 28, and 30 of apparatus 24. A clock 34 is also provided for use with microprocessor 32 as is well known, as is a memory 36 which is preferably a combination of read-only memory (ROM) for storing program instructions and random access memory (RAM) for storing program variables and video and audio inputs prior to moving the inputs to storage apparatus 22. Memory 36 also preferably includes a cyclic buffer 38 for storing video and audio inputs in FIFO fashion. Local area network (LAN) circuitry 39 is also provided for communication with one or more workstations and/or other external devices via a LAN.

System 10 also preferably includes one or more workstations 40 in communication with logging apparatus 24, either by direct connection or via LAN circuitry 39. Each workstation 40 typically comprises a computer 42, a display 44, a keyboard 46, and a printer 48, as well as other common workstation peripherals (not shown), and may serve as any of reporting, input retrieval, and annotation apparatus.

System 10 may also include one or more detection devices 50, such as a sound or motion detector, that can detect a non-ambient characteristic in a field of view and provide a signal relating to a detected non-ambient characteristic to logging apparatus 24. Detection device 50 may also detect the presence or absence of a signal in its field of view, the signal being transmitted by a transmitter 52, such as an electronic collar.

One or more forward-looking infrared (FLIR) cameras 54 may also be provided with system 10, each FLIR camera 54 preferably having a field of view that overlaps the field of view of a visible-light video input device 12, as illustrated by dashed lines 56.

The operation of system 10 and its various elements is now described in greater detail hereinbelow with respect to typical operational scenarios illustrated with additional reference to FIGS. 1–7.

Figure 2:
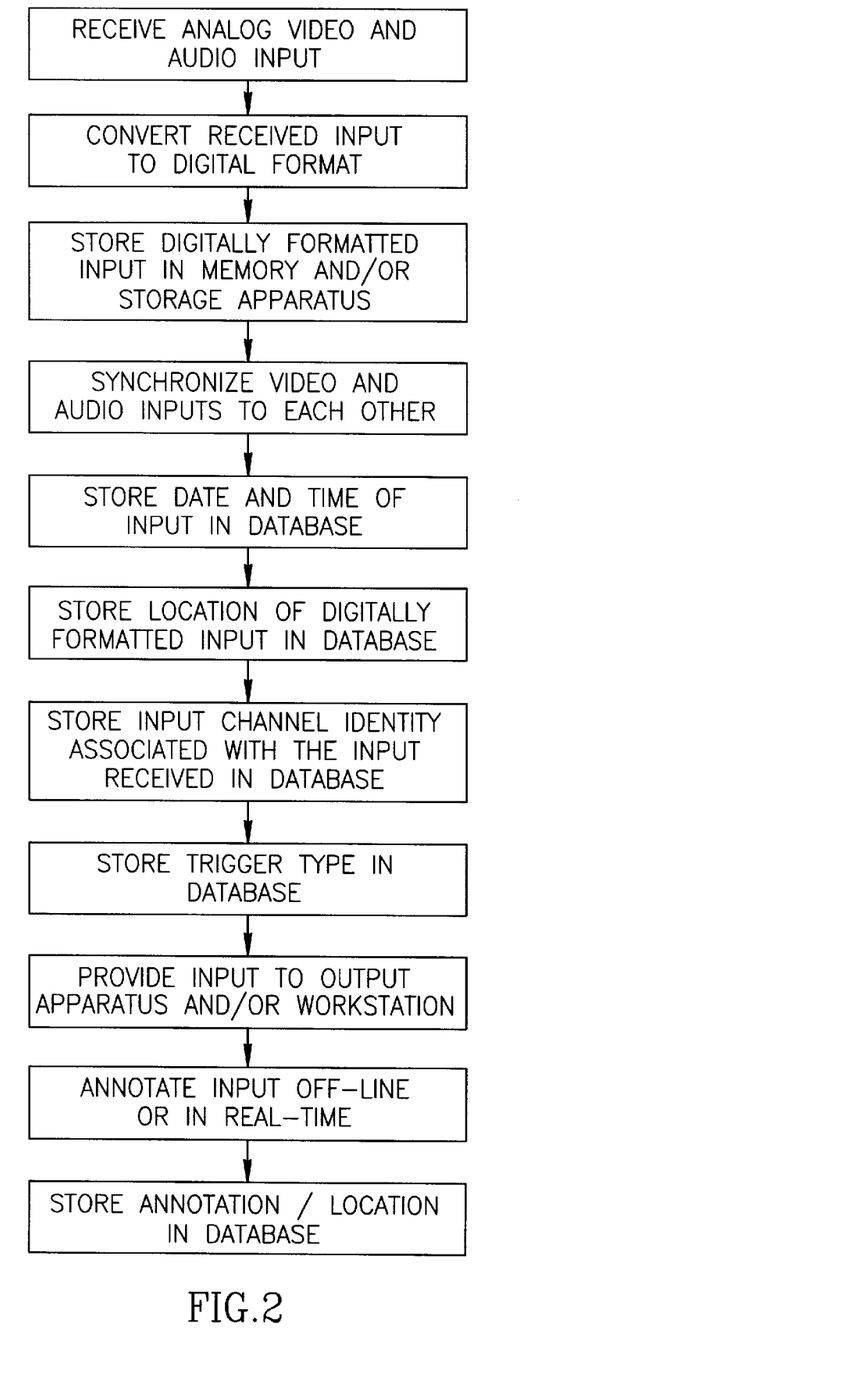
FIG. 2 is a simplified flowchart illustration of a method of operation of the digital video logging system of FIG. 1, the method being operative in accordance with a preferred embodiment of the present invention.

Reference is now made to FIG. 2 which is a simplified flowchart illustration of a method of operation of the digital video logging system of FIG. 1, the method being operative in accordance with a preferred embodiment of the present invention. In the method of FIG. 2 logging apparatus 24 receives analog video and audio inputs from video and audio input devices 12 and 14 via interface circuitry 26. Video and audio input may be received either continuously or periodically where logging apparatus 24 specifically activates a specific device 12 or 14 in order to begin receiving input therefrom. Periodic activation is controlled by microprocessor 32 acting as a scheduler in accordance with a predetermined activation schedule or scheduling algorithm maintained in digital storage 22, database 30, and/or memory 36. As is well known in the art, logging apparatus 24 may control power to devices 12 and 14, and may zoom, pan, and tilt video input devices 12. Activation of a device 12 or 14 may also be manually triggered by an operator via workstation 40.

Logging apparatus 24 converts the received video and audio inputs to digital format, optionally applying known compression techniques such as ITU T H.261, ITU-T H.263 or wavelet-based video compression algorithms. Different input devices may have different types of compression and different compression ratios applied to inputs received therefrom in accordance with scheduling instructions or other predetermined instructions. The digitally formatted inputs may be stored in accordance with pre determined storage instructions in memory 36 and storage apparatus 22. Digitally formatted input may be first stored in memory 36, then transferred to hard disk, and later transferred to DAT or AIT. Video and audio inputs are preferably synchronized to each other by determining the date and time when each input is received using clock 34 and storing the date and time in database 30 along with the location of the stored digitally formatted input in storage apparatus 22. An input channel identified associated with the device 12 or 14 from which the input was received may also be stored in database 30 along with the location of the stored digitally formatted input in storage apparatus 22. The type of trigger, manual or scheduled, may likewise be stored in database 30.

As input is received from devices 12 and 14, logging apparatus 24 may provide any of the input to output apparatus 16 and/or workstation 40 in accordance with predetermined output instructions. Input received from two or more video input devices 12 may be combined to form a single image comprising multiple viewing windows within the image, each window corresponding to one of the input devices 12 and displayed via output apparatus 16 and/or workstation 40. An operator may use workstation 40 as annotation apparatus for annotating an input being displayed, either off-line or in real-time, such as is shown at reference number 58 (FIG. 1). Annotations are preferably stored in database 30 along with the location of the stored digitally formatted input storage apparatus 22.

Figure 3A:
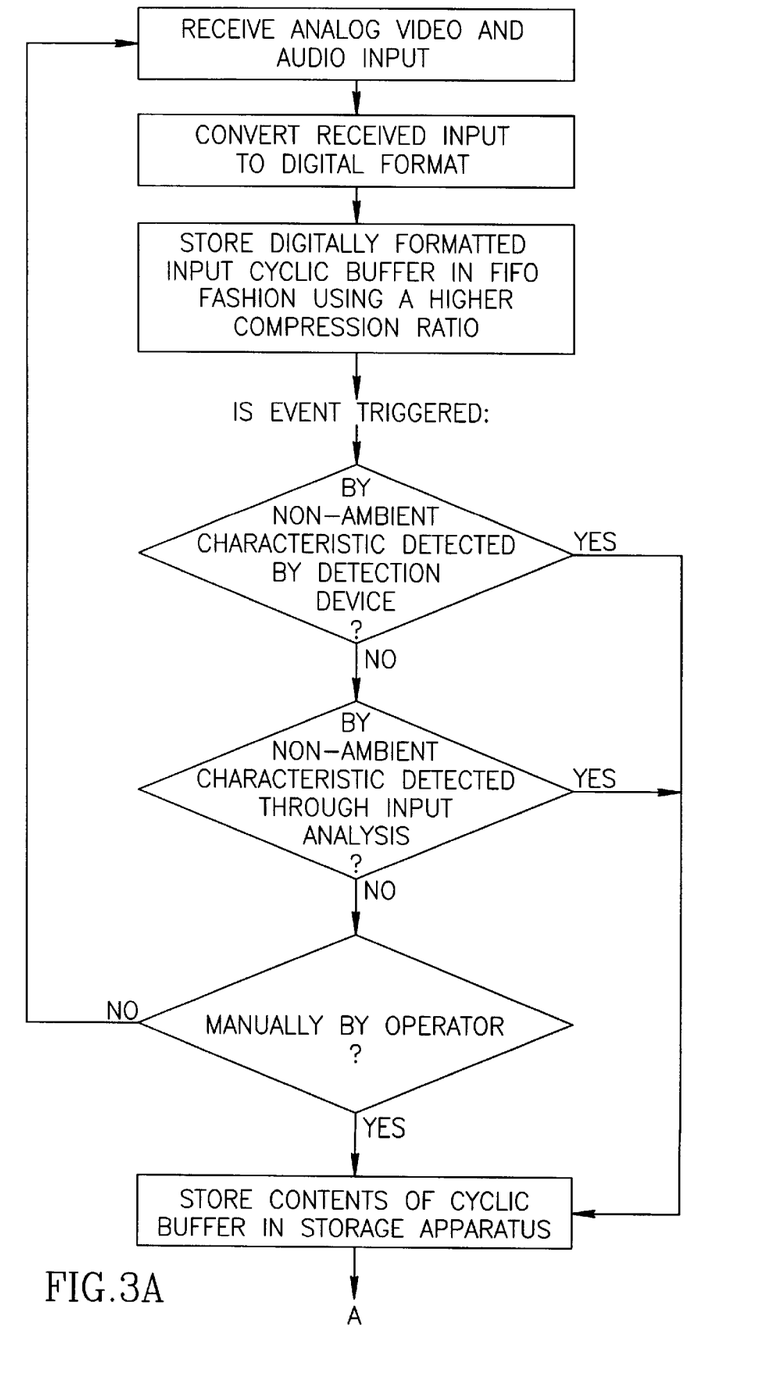
FIG. 3 is a simplified flowchart illustration of a method of operation of the digital video logging system of FIG. 1 in response to a detected non-ambient characteristic, the method being operative in accordance with a preferred embodiment of the present invention.
Figure 3B:
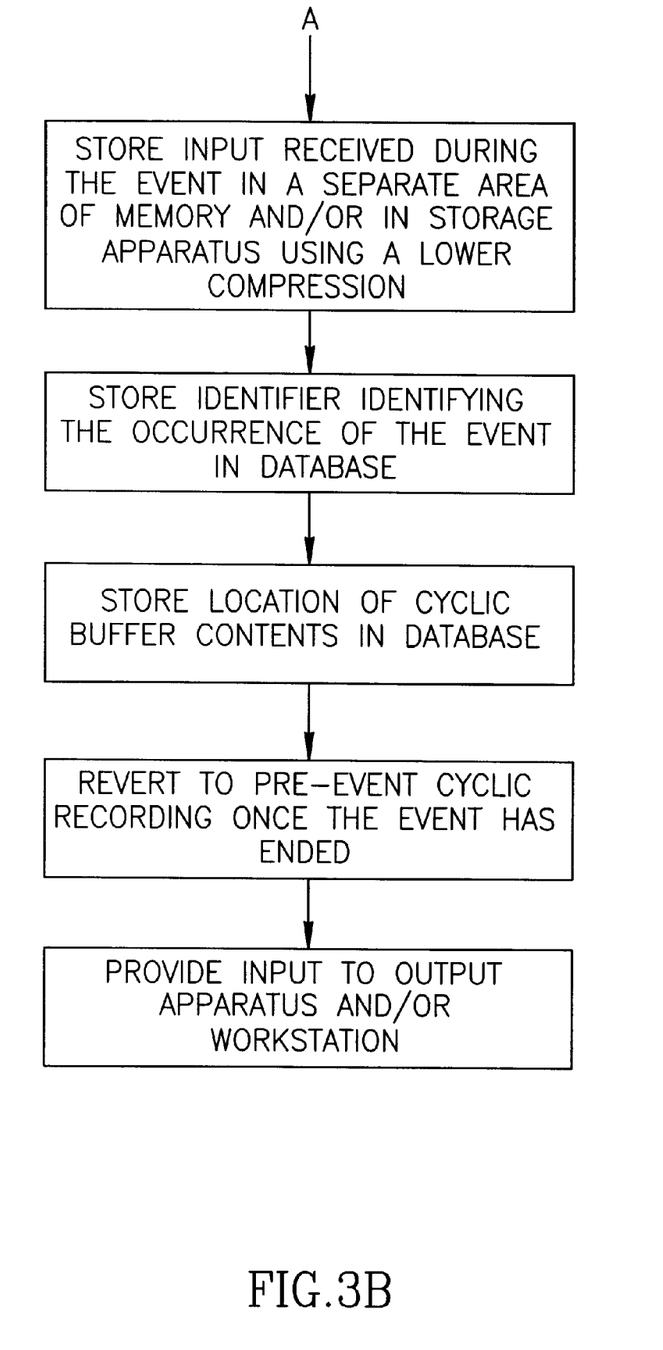

Reference is now made to FIG. 3 which is a simplified flowchart illustration of a method of operation of the digital video logging system of FIG. 1 in response to a detected non-ambient characteristic, the method being operative in accordance with a preferred embodiment of the present invention. In the method of FIG. 3 logging apparatus 24 receives and converts video and audio input from devices 12 and 14, converts the input to digital format, and stores the digitally formatted input in cyclic buffer 38 in FIFO fashion. Input that is to be stored in buffer 38 may be converted using a relatively high compression ratio. A separate cyclic buffer 38 may be maintained for each individual input device 12 and 14.

At some point, a non-ambient characteristic, such as motion, sound, heat, or a signal being transmitted by transmitter 52, is detected in a field of view of a specific device 12 or 14. The non-ambient characteristic may be detected by detection device 50 which then provides a signal indicating the detection to logging apparatus 24. Additionally or alternatively, the detection of motion, sound, or heat may be determined by logging apparatus 24 analyzing the video and audio input using known digital signal analysis techniques.

The detection of the non-ambient characteristic represents an "event" that is to be accorded a special significance relative to the input received prior to the event. As such, inputs received during the event are not stored to the cyclic buffer, but rather are stored in a separate area of memory 36 and/or in storage apparatus 22. Inputs received during the event are also typically stored using a lower compression ratio than that used for pre-event input. The contents of buffer 38 are also preferably stored in storage apparatus 22 at the relatively high compression ratio. An identifier identifying the occurrence of the event is preferably stored in database 30 along with the locations of the stored contents of buffer 38 and of the input received during the event and stored in storage apparatus 22. Logging apparatus 24 may revert back to pre-event cyclic recording once the event has ended, typically after a predetermined time has elapsed since the start of the event or after the event conclusion is signaled by an operator via workstation 40.

Upon detection of an event, logging apparatus 24 preferably provides the relevant audio and/or video input to output apparatus 16. Database 30 preferably contains a predefined set of rules that determines which inputs will be provided to which output apparatus 16 based on factors such as the time and date of the event, the device identity, the security level of the operator viewing the output, and the number of events that are already displayed on a particular output apparatus 16.

The device 12 or 14 in whose field of view the non-ambient characteristic is detected need not be the device 12 or 14 whose pre- and intro-event inputs are stored in association with the event. Indeed, an event detected with respect to the field of view of one device 12 or 14 may be used to trigger the recording of pre- and intro-event input from one or more other devices 12 or 14 instead of or in addition to the device where the event is detected.

An event may also be manually triggered by an operator via workstation 40, and the devices 12 and 14 for which event inputs are to be recorded and stored may also be manually specified. In this case an indication of the manually-triggered event may be stored in database 30 along with the location of the stored digitally formatted input in storage apparatus 22.

Figure 4:
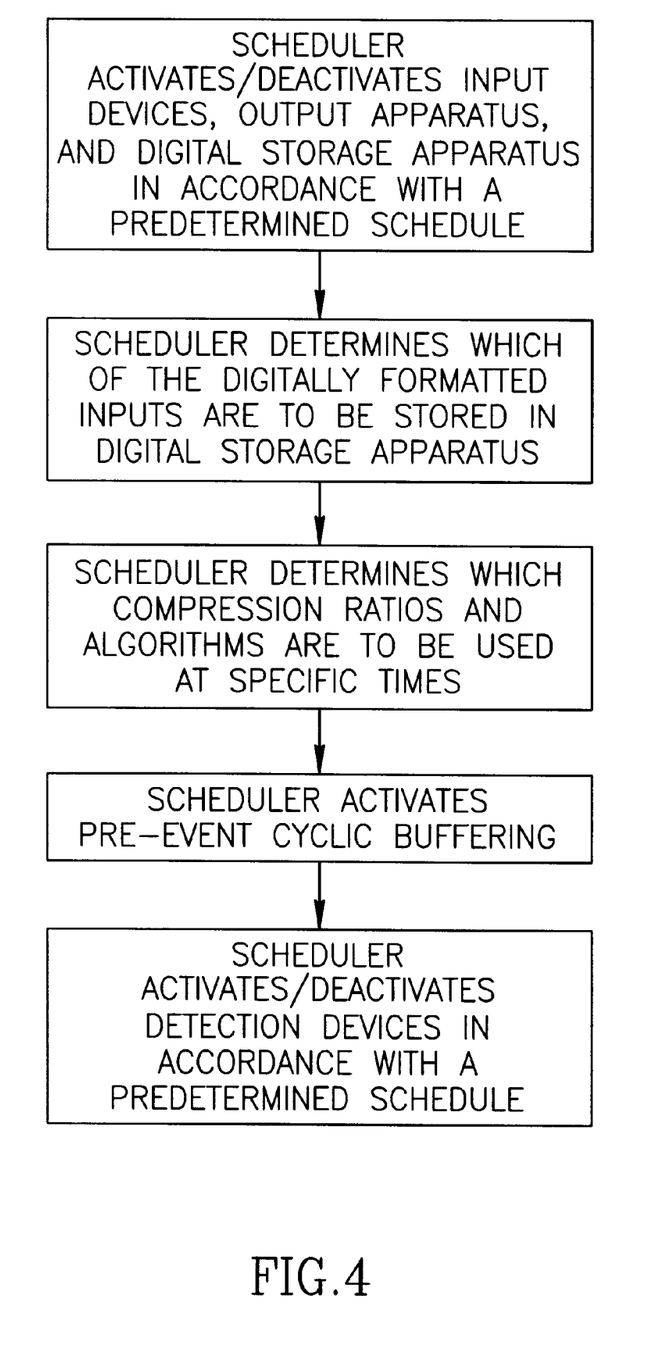
FIG. 4 is a simplified flowchart illustration of a method of scheduled operation of the digital video logging system of FIG. 1, the method being operative in accordance with a preferred embodiment of the present invention.

Reference is now made to FIG. 4 which is a simplified flowchart illustration of a method of scheduled operation of the digital video logging system of FIG. 1, the method being operative in accordance with a preferred embodiment of the present invention. In the method of FIG. 4 logging apparatus 24 continuously receives and converts video and audio input from devices 12 and 14. The decision regarding which inputs are to be converted to digital format and stored is controlled by microprocessor 32 in its role as scheduler as described hereinabove with reference to FIG. 2. Microprocessor 32, now also referred to as scheduler 32, may activate and deactivate any of the input devices 12 and 14, output apparatus 16, digital storage apparatus 22, and any other elements of logging apparatus 24 in accordance with a predetermined schedule. The schedule may determine which of the digitally formatted inputs are to be stored in digital storage apparatus 22, and may also determine which compression ratios and algorithms are to be used at specific times by any of the input devices 12 and 14, output apparatus 16, digital storage apparatus 22, and any other elements of logging apparatus 24. The scheduler may activate pre-event cyclic buffering as described hereinabove with reference to FIG. 3 and may activate and deactivate detection devices 50 in accordance with a predetermined schedule.

Figure 5:
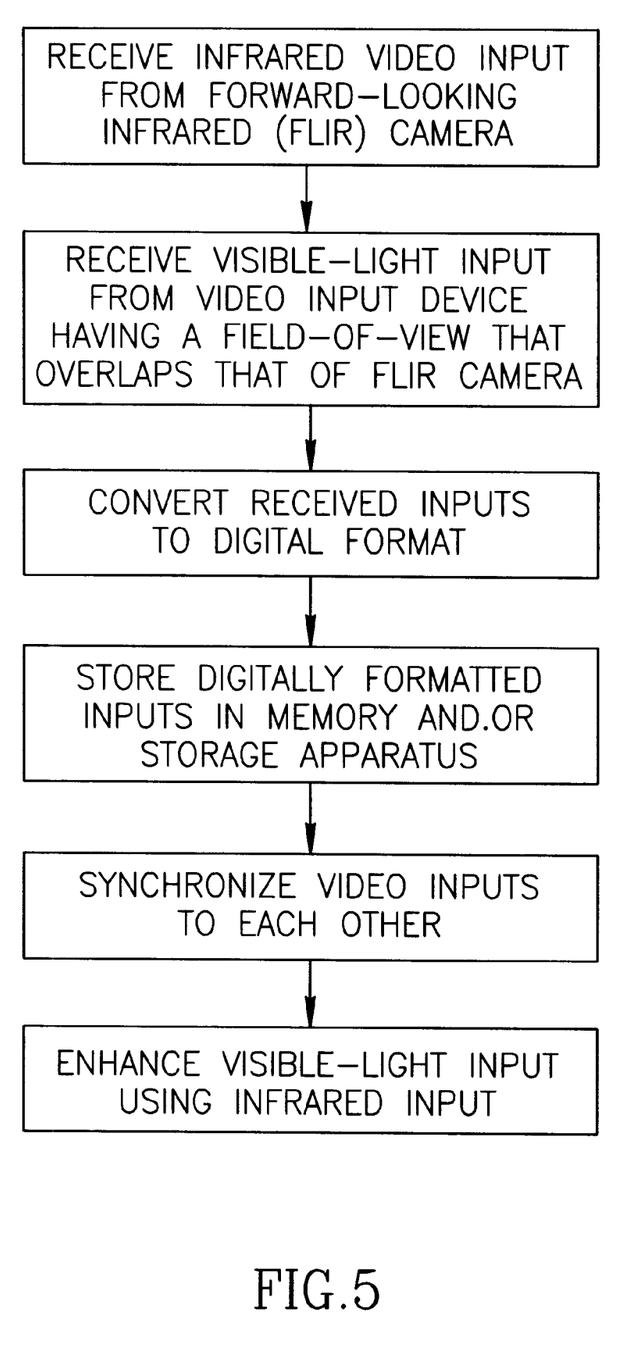
FIG. 5 is a simplified flowchart illustration of a method of FLIR operation of the digital video logging system of FIG. 1, the method being operative in accordance with a preferred embodiment of the present invention.

Reference is now made to FIG. 5 which is a simplified flowchart illustration of a method of FLIR operation of the digital video logging system of FIG. 1, the method being operative in accordance with a preferred embodiment of the present invention. In the method of FIG. 5 infrared video input is received from forward-looking infrared (FLIR) camera 54 and from visible-light video input device 12 where the field of view of both device 12 and camera 54 overlap. The inputs are digitally converted, stored, and synchronized in the manner described hereinabove with reference to FIG. 2. The input from device 12 may be enhanced using the input from camera 54 using known video enhancing techniques.

Figure 6:
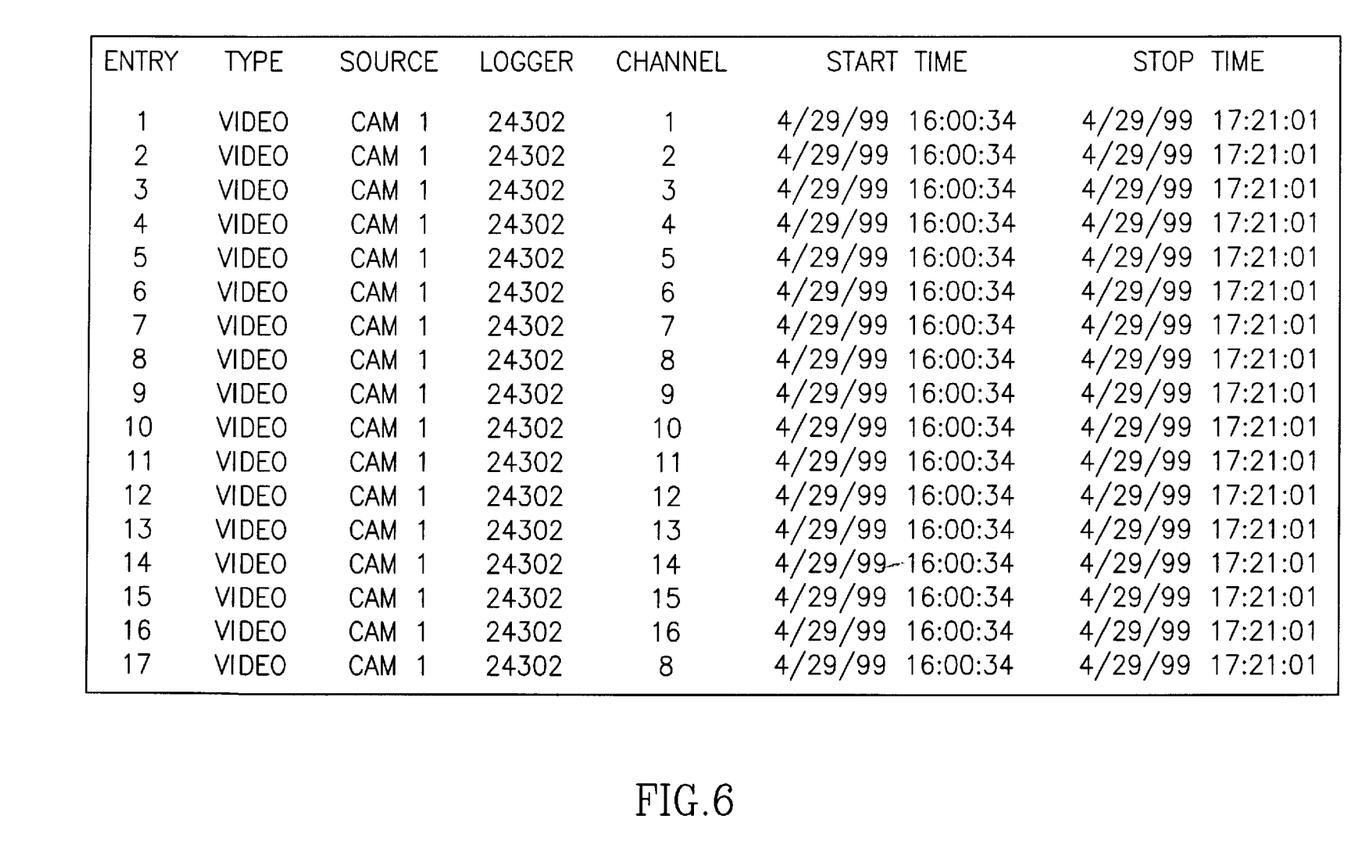
FIG. 6 is a simplified pictorial illustration provided by the digital video logging system of FIG. 1, constructed and operative in accordance with a preferred embodiment of the present invention.

Reference is now made to FIG. 6 which is a simplified pictorial illustration of reporting provided by the digital video logging system of FIG. 1, constructed and operative in accordance with a preferred embodiment of the present invention. The illustrative report shown in FIG. 6 presents the input type, the source of the input, the input channel, and the start and stop times of the recording. Other information regarding inputs and may be provided via workstation 40 either in "real-time" as inputs are being received, off-line at a later time after inputs are received, as pop-up messages to the operator via display 44 regarding detected events, and/or as messages sent to a remote location via LAN, WAN, fax, pager, or pre-recorded telephone message.

Figure 7:
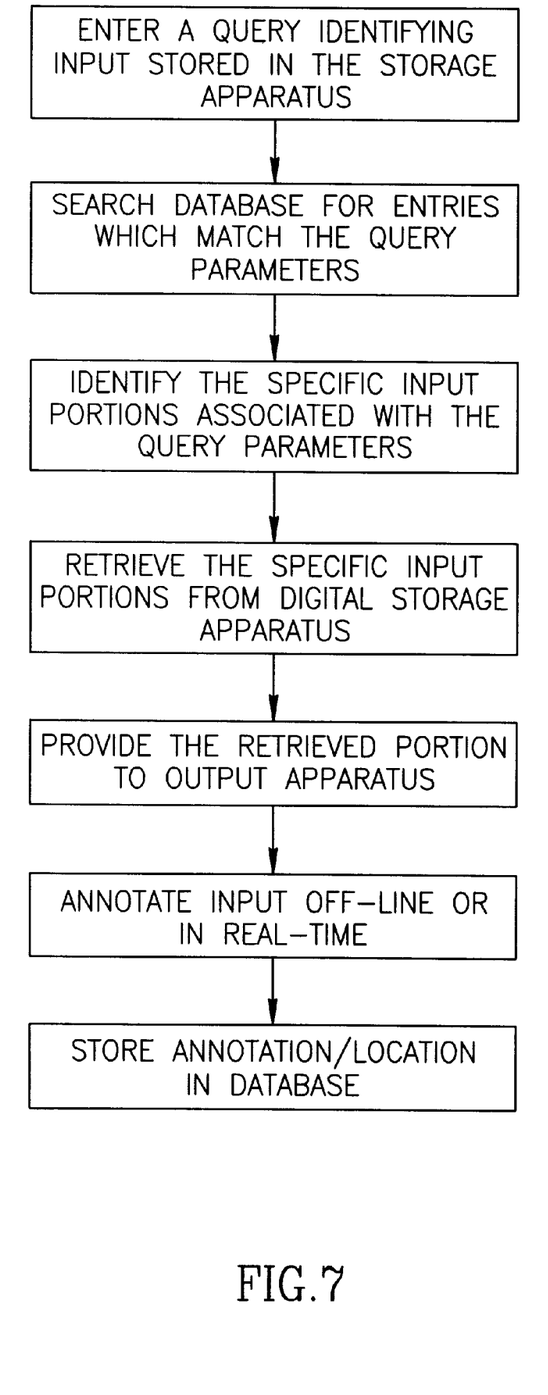
FIG. 7 is a simplified flowchart illustration of a method of input retrieval and playback operation of the digital video logging system of FIG. 1, the method being operative in accordance with a preferred embodiment of the present invention.

Reference is now made to FIG. 7 which is a simplified flowchart illustration of a method of input retrieval and playback operation of the digital video logging system of FIG. 1, the method being operative in accordance with a preferred embodiment of the present invention. In the method of FIG. 7 an operator uses workstation 40 as an input retrieval apparatus by entering a query including at least one datum related to any of the portions of the digitally formatted input stored in storage apparatus 22. Database 30 is searched for entries which match the query parameters and identifies the specific input portions associated with the query parameters. Workstation 40 then instructs logging apparatus 24 to retrieve the specific input portions from digital storage apparatus 22 and provide the portion to output apparatus 16 where they may be annotated in the manner described hereinabove with reference to FIG. 2.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A digital video logging system comprising:
    a plurality of video input devices;
    a plurality of audio input devices;
    output apparatus operative to provide either of video and audio output;
    digital storage apparatus operative to store digitally formatted input; and
    logging apparatus operative to:
        receive analog input from any of said input devices,
        convert to digital format any of said analog input received,
        synchronize any of said digitally formatted input converted from any of said analog input received from more than one of said input devices,
        selectively provide any of said digitally formatted input to said digital storage apparatus, and
        selectively provide any of said digitally formatted input to said output apparatus.

2. A system according to claim 1 and further comprising a database, wherein said logging apparatus is operative to associate any portion of said digitally formatted input with any of an input channel datum, a time datum, a date datum, a non-ambient characteristic datum, and a trigger datum, and maintain any of said data in said database.

3. A system according to claim 1 and further comprising a database, wherein said logging apparatus is operative to associate any portion of said digitally formatted input substantially in real-time to receipt of said portion with any of an input channel datum, a time datum, a date datum, a non-ambient characteristic datum, and a trigger datum, and maintain any of said data in said database.

4. A system according to claim 1 wherein said logging apparatus is operative to selectively control any of said input devices to provide analog input therefrom.

5. A system according to claim 1 and further comprising:
    at least one cyclic buffer associated with at least one of said input devices, wherein said logging apparatus is operative to:
        detect a non-ambient characteristic associated with any of said digitally formatted input;
        cyclically store any of said digitally formatted input in said cyclic buffer prior to detecting said non-ambient characteristic; and
        provide said any of said digitally formatted input stored in said cyclic buffer to said digital storage apparatus subsequent to said non-ambient characteristic being detected.

6. A system according to claim 5 wherein said digitally formatted input is digitally formatted video input and wherein said non-ambient characteristic is a non-ambient motion characteristic associated with any of said digitally formatted video input.

7. A system according to claim 5 wherein said digitally formatted input is digitally formatted audio input and wherein said non-ambient characteristic is a non-ambient sound characteristic associated with any of said digitally formatted audio input.

8. A system according to claim 5 wherein said logging apparatus is operative to detect said non-ambient characteristic associated with any of said digitally formatted input converted from said analog input received from said at least one input device associated with said at least one cyclic buffer.

9. A system according to claim 5 wherein said logging apparatus is operative to detect said non-ambient characteristic associated with said digitally formatted input converted from said analog input received from any of said input devices other than said at least one input device associated with said at least one cyclic buffer.

10. A system according to claim 1 and further comprising:
    at least one detection device operative to detect a non ambient characteristic and provide a signal subsequent to and in connection with detection of said non-ambient characteristic; and
    at least one cyclic buffer associated with at least one of said input devices, wherein said logging apparatus is operative to:
        receive said signal from said detection device;
        cyclically store any of said digitally formatted input in said cyclic buffer prior to receiving said signal;
        provide any of said digitally formatted input stored in said cyclic buffer to said digital storage apparatus subsequent to receiving said signal.

11. A system according to claim 10 wherein said non-ambient characteristic is a non-ambient motion characteristic.

12. A system according to claim 10 wherein said non-ambient characteristic is a non-ambient sound characteristic.

13. A system according to claim 10 wherein said non-ambient characteristic is the presence of a transmitted signal detected within a predefined detection region associated with said detection device.

14. A system according to claims 5 or 10 wherein:
    said logging apparatus is operative to cyclically store any of said digitally formatted inputs in said cyclic buffer and said digital storage apparatus at a first compression ratio;
    said digital storage apparatus is operative to store said digitally formatted input stored in said cyclic buffer at a said first compression ratio; and
    said digital storage apparatus is operative to store said digitally formatted input not stored in said cyclic buffer at a second compression ratio that is not equal to said first compression ratio.

15. A system according to claim 1 and further comprising a scheduler operative to activate and deactivate any of said input devices, output apparatus, digital storage apparatus, and logging apparatus in accordance with a predetermined schedule.

16. A system according to claim 15 wherein said scheduler is operative to activate said logging apparatus to selectively provide any of said digitally formatted inputs to said digital storage apparatus in accordance with a predetermined schedule.

17. A system according to claim 15 wherein said scheduler is operative to instruct any of said input devices, output apparatus, digital storage apparatus, and logging apparatus to operate at a specific compression rate in accordance with a given time in said predetermined schedule.

18. A system according to claim 5 and further comprising a scheduler operative to activate said logging apparatus in accordance with a predetermined schedule to cyclically store any of said digitally formatted input in said cyclic buffer prior to detecting said non-ambient characteristic.

19. A system according to claim 10 and further comprising a scheduler operative to activate and deactivate said detection device in accordance with a predetermined schedule.

20. A system according to claim 19 wherein said scheduler is operative to activate said logging apparatus in accordance with said predetermined schedule to cyclically store any of said digitally formatted input in said cyclic buffer prior to detecting said non-ambient characteristic.

21. A system according to claim 1 wherein:
said plurality of video input devices comprises:
at least one visible light input device capable of providing light input that is visible to the human eye; and
at least one infrared light input device capable of providing infrared light input; and
said visible light input device and said infrared light input device have substantially the same field of view.

22. A system according to claim 21 wherein said logging apparatus is operative to synchronize digitally formatted input converted from said input received from said visible light input device and said infrared light input device.

23. A system according to claim 1 wherein said digital storage apparatus is operative to store digitally formatted input converted from said analog input received from a first of said input devices at a first compression ratio and digitally formatted input converted from said analog input received from a second of said input devices at a second compression ratio that is not equal to said first compression ratio.

24. A system according to claim 1 and further comprising reporting apparatus operative to provide a real-time activity report relating to any of said inputs.

25. A system according to claim 2 and further comprising reporting apparatus operative to provide an off-line activity report relating to any of said data in said database.

26. A system according to claim 2 and further comprising input retrieval apparatus operative to:
accept a query comprising at least one datum related to any of said portions of said digitally formatted input;
identify said portion associated with said datum in said database; and
instruct said logging apparatus to:
retrieve said portion from said digital storage apparatus, and
provide said portion to said output apparatus.

27. A system according to claim 2 and further comprising annotation apparatus operative to:
accept an operator annotation related to at least one selected portion of said portions of said digitally formatted input; and
maintain said annotation in said database in relation to said selected portion.

28. A logging apparatus adapted to synchronize at least two digitally formatted video inputs.

29. A logging apparatus adapted to compress at a compression ratio video input received from an input device and adapted to compress at a different compression ratio video input received from another input device.

30. The logging apparatus of claim 29, said logging apparatus further adapted to vary the compression ratio for each input device from time to time.

* * * * *